United States Patent [19]
Toth et al.

[11] Patent Number: 5,441,325
[45] Date of Patent: Aug. 15, 1995

[54] VANITY MIRROR WITH OPPOSED SLIDING COVERS

[75] Inventors: Eric S. Toth; Michael J. Gregg, both of Holland, Mich.

[73] Assignee: Prince Corporation, Holland, Mich.

[21] Appl. No.: 88,567

[22] Filed: Jul. 7, 1993

[51] Int. Cl.6 ............................................. B60J 3/00
[52] U.S. Cl. ........................... 296/97.2; 296/97.5; 49/116; 49/122
[58] Field of Search .............. 296/97.2, 97.3, 97.1, 296/97.5; 49/116, 122

[56] References Cited

U.S. PATENT DOCUMENTS

| | | | |
|---|---|---|---|
| 522,936 | 7/1894 | Engel | 49/116 |
| 575,162 | 1/1897 | Munderloh | 49/116 |
| 778,952 | 1/1905 | Cornell | 49/116 |
| 832,458 | 10/1906 | Cessey | 49/116 |
| 3,094,007 | 6/1963 | Luhrs | 49/116 X |
| 4,227,241 | 10/1980 | Marcus | 362/61 |
| 4,421,355 | 12/1983 | Marcus | 296/97 |
| 4,564,234 | 1/1986 | Kaiser et al. | 296/97 |
| 4,648,011 | 3/1987 | Boote et al. | 362/135 |
| 4,653,798 | 3/1987 | White et al. | 296/97 |
| 4,685,723 | 8/1987 | Canadas | 296/97 |
| 4,791,537 | 12/1988 | Fisher et al. | 362/135 |
| 4,922,391 | 5/1990 | Dykstra | 362/144 |
| 4,948,240 | 8/1990 | Zipperle | 350/606 |
| 4,961,608 | 10/1990 | Nash | 296/97.5 |
| 4,979,079 | 12/1990 | Tawaraya | 362/135 |
| 5,014,169 | 5/1991 | Chetwynd | 362/142 |
| 5,054,839 | 10/1991 | White et al. | 296/97.1 |
| 5,061,003 | 10/1991 | Gabas | 396/97.1 |
| 5,061,004 | 10/1991 | Happich et al. | 296/97.5 |
| 5,104,174 | 4/1992 | Gute | 296/97.4 |
| 5,301,994 | 4/1994 | Wilson | 296/97.2 |

FOREIGN PATENT DOCUMENTS

2429685  6/1978  France .

*Primary Examiner*—Joseph D. Pape
*Attorney, Agent, or Firm*—Price, Heneveld, Cooper, DeWitt & Litton

[57] ABSTRACT

A vehicle accessory such as a visor includes a body with a vanity mirror frame and mirror mounted thereto. A pair of opposed covers are slidably coupled to the mirror frame and are coupled together such that movement of one cover between an open and closed position effects the movement of the remaining cover in an opposite direction. In a preferred embodiment of the invention, the inwardly facing ends include external illumination sources which abut one another when the covers are closed to provide a point light source for the interior illumination of the vehicle when the visor is in a lowered use position and which is directable by movement of the visor for providing illumination for the vehicle occupants. When the covers are moved to an open position, the illumination sources are spaced-apart on opposite edges of the mirror and provide illumination for the face of the user of the illuminated vanity mirror facilitating use under low, ambient light conditions.

13 Claims, 2 Drawing Sheets

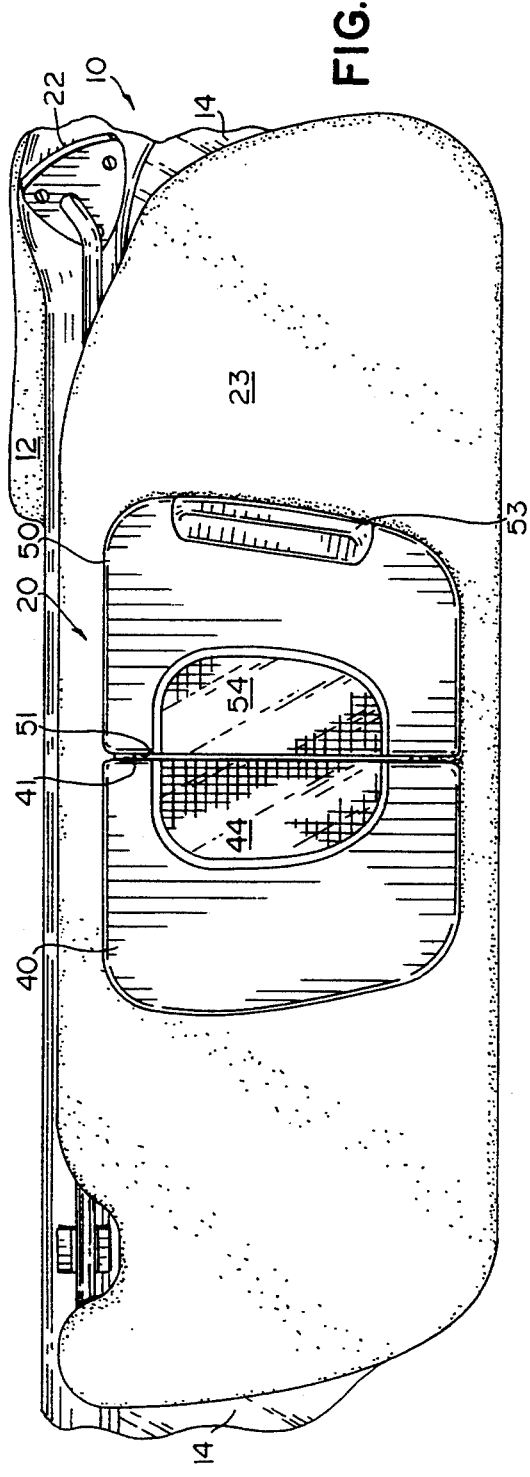
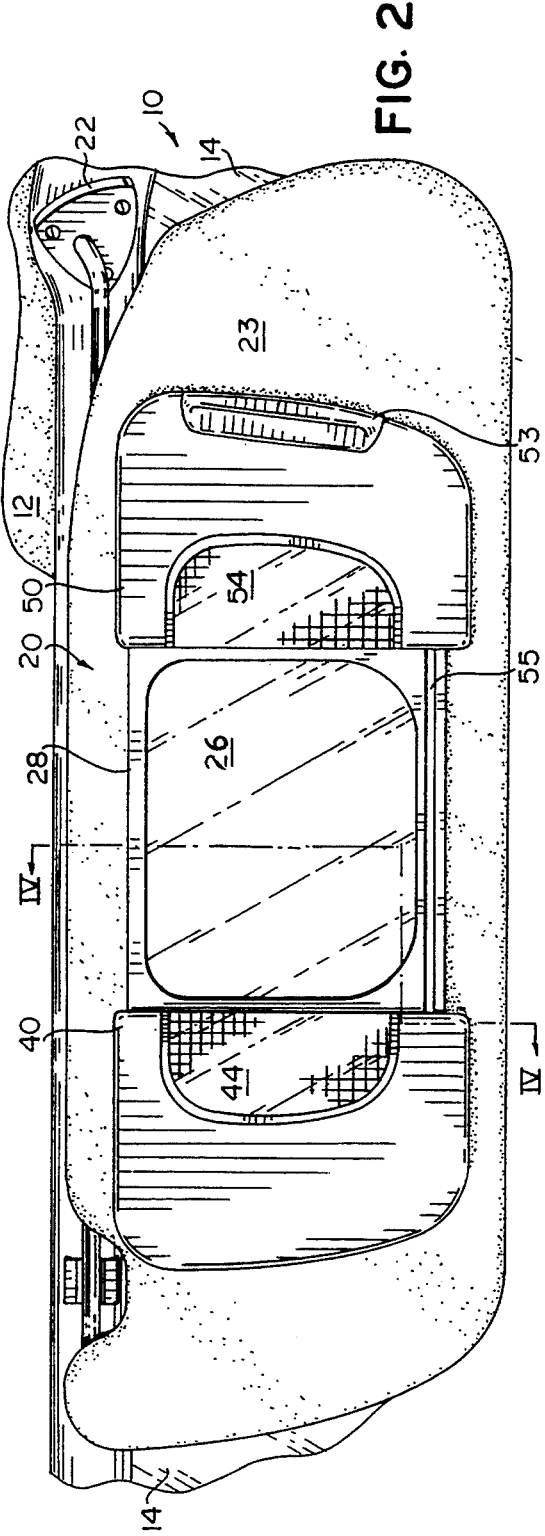

VANITY MIRROR WITH OPPOSED SLIDING COVERS

BACKGROUND OF THE INVENTION

The present invention pertains to vehicle visors and particularly to a visor having a covered illuminated vanity mirror.

Vehicles such as automobiles frequently include visors which include, either as an option or standard equipment on some models, illuminated vanity mirrors. Frequently, such vanity mirrors are covered when not in use. An example of such a vanity mirror visor is represented by U.S. Pat. No. 4,227,241 which discloses a visor which has been commercialized for several years.

U.S. Pat. No. 4,421,355 represents an alternative approach to the illuminated vanity visor by which a visor includes a vanity mirror which is covered by a pair of vertically pivoted doors which open and close and which include lighting means on the inner surface of the doors facing the mirror when closed, but facing outwardly for illuminating the face of the user of the vanity mirror when the doors are open for use. Other covers for vanity mirror visors which include illumination have been slidably mounted to the visor and include, for example, U.S. Pat. No. 4,922,391. Also, French Patent 2429685 discloses a vanity mirror which does not include illumination, but which includes a pair of opposed, internally mounted independently movable sliding covers for covering the mirror when not in use.

Although all of these vanity mirror visors provide covered vanity mirrors, and some with illumination for use of the mirror under low, ambient light conditions, the system of the present invention provides improved illumination and cover means for vanity mirror visors.

SUMMARY OF THE INVENTION

The visor of the present invention comprises a visor defined by a visor body including a vanity mirror frame and mirror mounted thereto. A pair of opposed covers are slidably coupled to said mirror frame and include inwardly facing, abutting edges when the covers are in a closed position and means coupling said sliding covers such that movement of one cover between an open and closed position effects the movement of the remaining cover in an opposite direction. In a preferred embodiment of the invention, the abutting edges of the covers include external illumination means which abut one another when the covers are closed to provide a spot light source for the interior illumination of the vehicle when the visor is in a lowered use position and which is directable by movement of the visor for providing illumination for the vehicle occupants. When the covers are moved to an open position, the illumination means are spaced-apart on opposite edges of the mirror and provide illumination for the face of the user of the illuminated vanity mirror facilitating use under low, ambient light conditions. Such an arrangement provides for a relatively compact visor design which can accommodate a relatively large illuminated vanity mirror with easily operated covers which further provide illumination for use of the mirror and for providing illumination for the interior of the vehicle. These and other features, objects, and advantages of the present invention will become apparent upon reading the following description thereof, together with reference to the accompanying drawings in which:

BRIEF DESCRIPTION OF THE DRAWINGS

FIG. 1 is a front elevational view of a visor embodying the present invention mounted to a vehicle shown with the covers in a first, or closed, position;

FIG. 2 is a fragmentary front elevational view of a portion of the visor shown in FIG. 1 shown with the covers moved to an open position;

DETAILED DESCRIPTION OF THE PREFERRED EMBODIMENT

Figure 4:
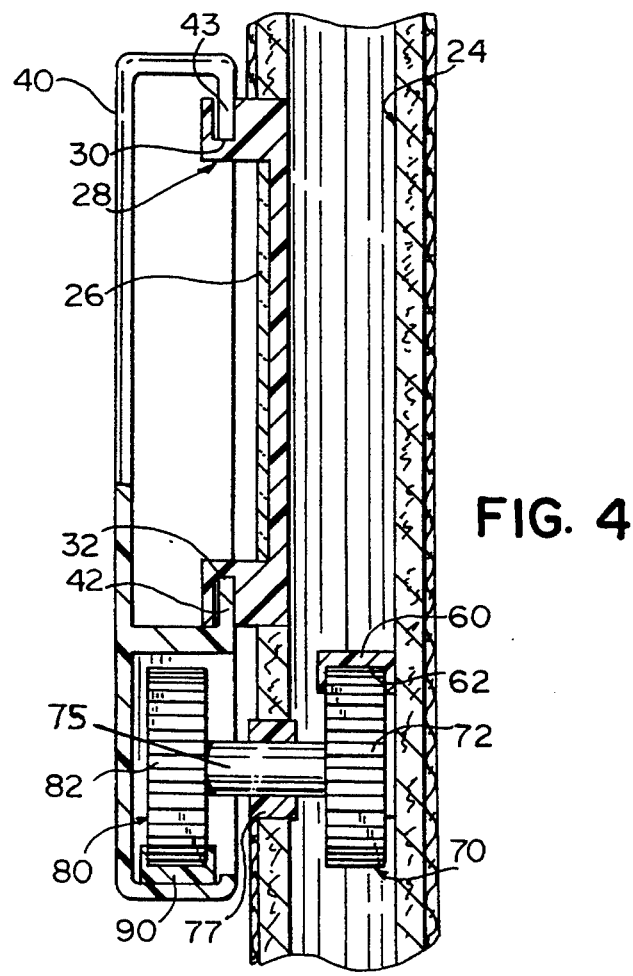
FIG. 4 is an enlarged fragmentary cross-sectional view taken along sectional lines IV—IV of FIG. 2, showing the cover mounting mechanism of the present invention.

Referring initially to FIG. 1 there is shown the interior of a vehicle 10 such as a automobile in which a visor 20 embodying the present invention is mounted. Visor 20 includes an elbow mounting bracket 22 of conventional design for mounting the visor to the roof structure 12 of the vehicle roof with the visor positioned above the vehicle windshield 14. The visor 20 is pivotable about the pivot mounting bracket 22 between a raised, stored position adjacent the vehicle roof, or a lowered use position as illustrated in FIGS. 1 and 2 covering the upper portion of the vehicle windshield 14. Visor 20 includes a visor body 24 which, as seen in FIG. 4, can be a molded polymeric body or one made of a fiberboard construction. Typically core 24 will be of a clamshell design having hinged front and rear surfaces covered by a suitable upholstery fabric 23 (FIG. 1) to conform the visor to the appearance of the interior of the vehicle in which the visor is mounted. One type of such visor core construction is disclosed in, for example, U.S. Pat. No. 5,031,951.

Mounted to the visor core 24 is a mirror frame 28 (FIGS. 2 and 4) which supports a mirror 26. Frame 28 is secured within an aperture 29 (FIG. 4) of the visor core 24 by conventional means such as mounting tabs or the like. The mirror frame 28 includes upper and lower guide tracks 30 and 32 respectively (FIG. 4) which extend along the length of the upper and lower horizontally extending legs of frame 28 for receiving opposed sliding covers 40 and 50 therein for slidably mounting the covers 40 and 50 to the mirror frame 28. For such purpose, the covers include rearwardly and inwardly projecting generally L-shaped legs 42 and 43 associated with cover 40 and similar legs on cover 50 for slidable mounting each of the covers 40 and 50 to the tracks 30 and 32 within the mirror frame 28 as best seen in FIG. 4.

Each of the covers 40 and 50 include mounted therein, along adjacent abutting edges 41 and 51 (FIG. 1) respectively, illumination means 44 and 54 comprising in the preferred embodiment an outer lens behind which there is mounted an electrical lamp coupled by suitable electrical conductors to the vehicle's electrical system through the pivot rod assembly 22 in a conventional manner such a taught by U.S. Pat. No. 4,421,355. Switch means (not shown) are mounted to the visor core and actuated by the movement of at least one of the covers to selectively provide operating power to the lamps associated with the illumination means 44 and 54 when the covers are moved from their closed position, shown in FIG. 1, to an open position, shown in FIG. 2, exposing mirror 26 for use.

The illumination means 44 and 54 is also coupled to the vehicle's power system through the vehicles interior illumination switch for activating the lamps for providing map reading vehicle interior illumination with the covers in a closed position for focusing light directable by the movement of the visor to the lap of the vehicle occupant for map reading functions or the like. The adjacently positioned lighting means 44 and 54 provide a spotlight source for use of the visor as a map reading lamp when in a lowered, adjusted use position. When the covers are moved to an open position as seen in FIG. 2 exposing the mirror 26, the illumination means provide spaced-apart light sources for providing even illumination for the face of the user of the mirror 26 under low, ambient lighting conditions.

Cover 50 includes a handle 53 integrally molded along the right edge of the molded polymeric cover for moving the covers between closed and open positions. The mechanism for intercoupling the sliding covers 40 and 50 to provide simultaneous opposed movement of the covers when only one of the covers is moved by the operator is now described in connection with FIGS. 3 and 4.

Figure 3:
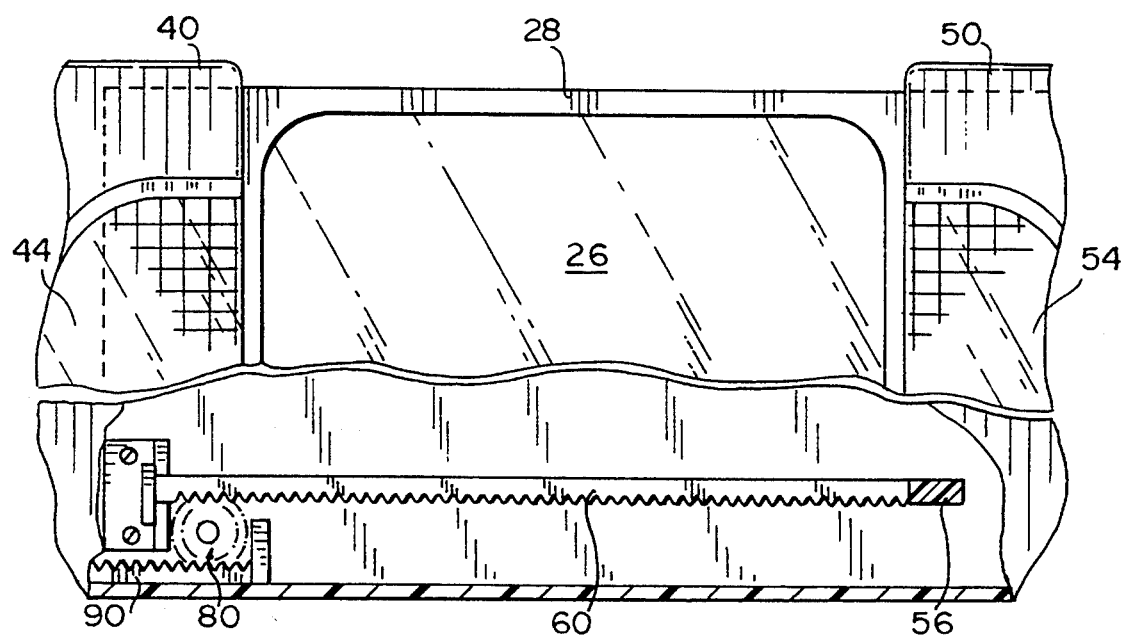
FIG. 3 is an enlarged fragmentary front elevational view partially in phantom form of the mechanism for intercoupling the covers of the visor shown in FIGS. 1 and 2.

Referring initially to FIG. 3, cover 50 includes a gear rack 60 which extends horizontally toward and overlies a pinion gear 70 with teeth 62 of rack 60 engaging teeth 72 of pinion gear 70 which is fixedly mounted on rotating axle 75 having a pinion gear 80 mounted with its teeth engaging teeth 92 of rack 90 mounted on the opposite end of axle 75. Axle 75 is rotatably mounted to core 24 by means of a suitable mounting bushing 77 to allow rotation of axle and gears 70 and 80 thereon. The axle is also supported in part by racks 60 and 90 engaging opposite sides of their associated pinion gears. Rack 60 is coupled to cover 50 by an arm 56 which extends through a slot 55 (FIGS. 2 and 3) extending through the front of the visor such that the rack 60 can be positioned within the body of the visor and is coupled to the externally mounted cover 50.

Movement of cover 50 from a closed position, shown in FIG. 1, to an open position, as seen in FIG. 2, causes rack 60 to move to the right, as shown in FIG. 3, or out of the drawing, as shown in FIG. 4, simultaneously rotating pinion gears 70 and 80 in a clockwise direction. Gear 80 in turn engages rack 90 which is mounted to cover 40 causing cover 40 to move in a direction opposite that of cover 50 since racks 60 and 90 are mounted on the opposite sides of the associated pinion gears 70 and 80 respectively.

Thus, movement of either cover 40 or cover 50 by the vehicle operator causes the other cover to track and move substantially through the same distance and in an opposite direction for either opening or closing the covers as desired. As the cover is moved toward a fully opened position, a switch (not shown) mounted adjacent rack 60 is engaged causing the illumination means 44 and 54 to be activated for providing illumination for use of the vanity mirror 26 now exposed by the open covers. The switch can also serve as a stop to prevent the covers from disengaging the mirror frame and thus limit the outward movement of the covers. Such an arrangement, therefore, provides for the automatic, synchronous opening and closing of opposed sliding covers for providing a relatively large vanity mirror which can be exposed for use and covered when not in use for safety purposes. When covered, the illumination means which face outwardly from the abutting edges of the opposed sliding covers can be employed for providing interior vehicle illumination. By providing means for synchronously coupling the covers for movement in opposed directions, operation of the covers is facilitated and the movement of the covers can be evenly controlled.

It will become apparent to those skilled in the art that structure other than that of the disclosed in the preferred embodiment for intercoupling the covers and/or for controlling the illumination provided by the illuminated vanity mirror visor of the present invention can be made without departing from the spirit or scope of the present invention as defined by the appended claims.

The embodiments of the invention in which an exclusive property or privilege is claimed are defined as follows:

1. A vanity mirror visor comprising:
   a visor body having a mirror frame and mirror mounted therein, said mirror frame including a pair of spaced guide tracks extending along opposite outer edges of said frame, said visor body including a slot formed therein and extending in spaced relationship from one of said outer edges of said frame;
   a pair of sliding opposed covers each including a pair of spaced legs extending in said guide tracks of said frame to slidably mount said covers to said mirror frame for movement toward one another between a closed position for covering said mirror and away from one another toward an open position exposing said mirror for use; and
   intercoupling means on the outside of said visor body for engaging one of said covers, said intercoupling means extending within said slot for engaging the other of said covers for intercoupling said covers such that movement of one cover synchronously effects the movement of the remaining cover in an opposite direction in the same amount.

2. The visor as defined in claim 1 and further including illumination means mounted to at least one of said covers for providing illumination for use of said mirror under low ambient light conditions.

3. The visor as defined in claim 2 wherein said illumination means comprises lens means on each of said covers and mounted to the outer side of said covers.

4. The visor as defined in claim 3 wherein said illumination means are each mounted to an edge of an associated cover which is adjacent the other cover when said covers are in a closed position.

5. The visor as defined in claim 1 wherein said means for intercoupling said covers includes a gear rack mounted to each of said covers and a pair of pinion gears mounted to an axle rotatably mounted to said visor such that movement of one of said covers rotates both pinion gears for moving the remaining cover in an opposite direction.

6. A vanity mirror assembly for a vehicle comprising:
   a support member having a mirror frame and mirror mounted therein, said mirror frame including a pair of spaced guide tracks extending along opposite outer edges of said frame, said mirror frame including a slot formed therein and extending in spaced relationship from one of said outer edges of said frame;
   a pair of sliding opposed covers each including a pair of spaced legs extending in said guide tracks of said frame to slidably mount said covers to said mirror frame for movement toward one another between a closed position for covering said mirror and away from one another toward an open position exposing said mirror for use; and intercoupling means on the outside of said mirror frame for engaging one of said covers, said intercoupling means extending within said slot for engaging the other of said covers for intercoupling said covers such that movement of one cover synchronously moves the remaining cover in an opposite direction and in the same amount.

7. The assembly as defined in claim 6 and further including illumination means mounted to at least one of said covers for providing illumination for use of said mirror under low, ambient light conditions.

8. The assembly as defined in claim 7 wherein said illumination means includes lens means on each of said covers which are mounted to the outer side of said covers.

9. The assembly as defined in claim 8 wherein said illumination means are each mounted to an edge of an associated cover which is adjacent the other cover when said covers are in a closed position.

10. The assembly as defined in claim 9 wherein said means for intercoupling said covers includes a gear rack mounted to each of said covers and a pair of pinion gears mounted to an axle rotatably mounted to said assembly such that movement of one of said covers rotates both pinion gears for moving the remaining cover in an opposite direction.

11. An illuminated vanity mirror visor comprising:

a visor body having a mirror frame and mirror mounted thereto;

a pair of covers slidably mounted to said mirror frame for movement in opposed relationship between a closed position covering said mirror and an open position exposing said mirror;

intercoupling means on the outside of said visor body for engaging one of said covers, said intercoupling means extending through a slot formed in said visor body for engaging the other of said covers for intercoupling said covers for synchronous movement of said covers in opposite directions such that manual movement of one cover effects movement of the opposite cover in a direction opposite said first cover; and illumination means mounted to the outer surface of at least one of said covers for providing illumination for use of the mirror under low, ambient light conditions.

12. The visor as defined in claim 11 wherein said illumination means includes lens means on each of said covers.

13. The visor as defined in claim 12 wherein said illumination means are mounted to adjacent edges of said covers to provide spot lighting to the vehicle when said covers are in a closed position, and spaced-apart lighting for the illumination of the face of a user when said covers are in an open position for use of said mirror.

* * * * *